United States Patent [19]

Krien

[11] Patent Number: 4,897,823
[45] Date of Patent: Jan. 30, 1990

[54] METHOD FOR LOCATION OF SHOCKS WITH A STRUCTURE-BORNE SOUND MONITORING SYSTEM, IN PARTICULAR IN PRESSURIZED ENCLOSURES IN POWER PLANTS

[75] Inventor: Konrad Krien, Erlangen, Fed. Rep. of Germany

[73] Assignee: Siemens Aktiengesellschaft, Munich, Fed. Rep. of Germany

[21] Appl. No.: 150,885

[22] Filed: Feb. 1, 1988

[30] Foreign Application Priority Data

Jan. 31, 1987 [DE] Fed. Rep. of Germany ....... 3702879

[51] Int. Cl.$^4$ .............................................. G01S 3/80
[52] U.S. Cl. .................................. 367/127; 367/124; 367/907; 73/572
[58] Field of Search ................ 367/121, 124, 126, 907, 367/118, 127; 376/249, 252; 73/572, 587; 364/460; 381/92

[56] References Cited

FOREIGN PATENT DOCUMENTS 0056553 7/1982 European Pat. Off. .
2114744 8/1983 United Kingdom .

OTHER PUBLICATIONS

Techniches Messen, vol. 47, No. 12, 1980, pp. 427–434, München, (J. Kolerus): "Acoustics Emission Analysis, Part 2, Method and Apparatus", p. 427, right column, line 22–p. 428 left column, line 16; pp. 431, 432, Section 2, Picture 6–8, are pertinent.
VDI Berichte No. 568 (1985), pp. 13–18, is pertinent.
Technical Review, No. 2, 1981, pp. 3–42, Närum, KDK; H. J. Rindorf; "Acoustics Emission Source Location in Theory and in Practice", pp. 9, line 14–p. 24, line 23 are pertinent.
B. J. Olma, Progress in Nuclear Energy, 1985, vol. 15, pp. 583 through 594 are pertinent.

Primary Examiner—Thomas H. Tarcza
Assistant Examiner—Daniel T. Pihulic
Attorney, Agent, or Firm—Herbert L. Lerner; Laurence A. Greenberg

[57] ABSTRACT

A method for the location of shocks with a structure-borne sound monitoring system is used especially for pressurized enclosures in power plants, particularly nuclear power plants. Structure-borne sound monitoring systems were heretofore dependent upon assumptions regarding the propagation velocities of the structure-borne sound sensors. According to the invention an exact method of ascertaining the propagation velocities and the burst location is given. The invention begins with the realization that the frequency spectrum of the respective bursts of information for clarification of the dispersion behavior, for identifying the sound wave modes and for deriving the group velocity of these modes is self-evident. Burst signal-rise time differences, wave modes, especially $s_0$ and $a_0$ mode, as well as the pertaining group velocities are then ascertained. The sound travel distance from the burst location to the sturcture-borne sound-sensors are determined on the basis of fact with at least double redundancy based on the general relationship $$L_{S-E} = t_{i,n} \cdot v_i v_n / (v_i - v_n)$$

so that at least three burst signal components are separated through corresponding electronic signal filter systems.

4 Claims, 6 Drawing Sheets

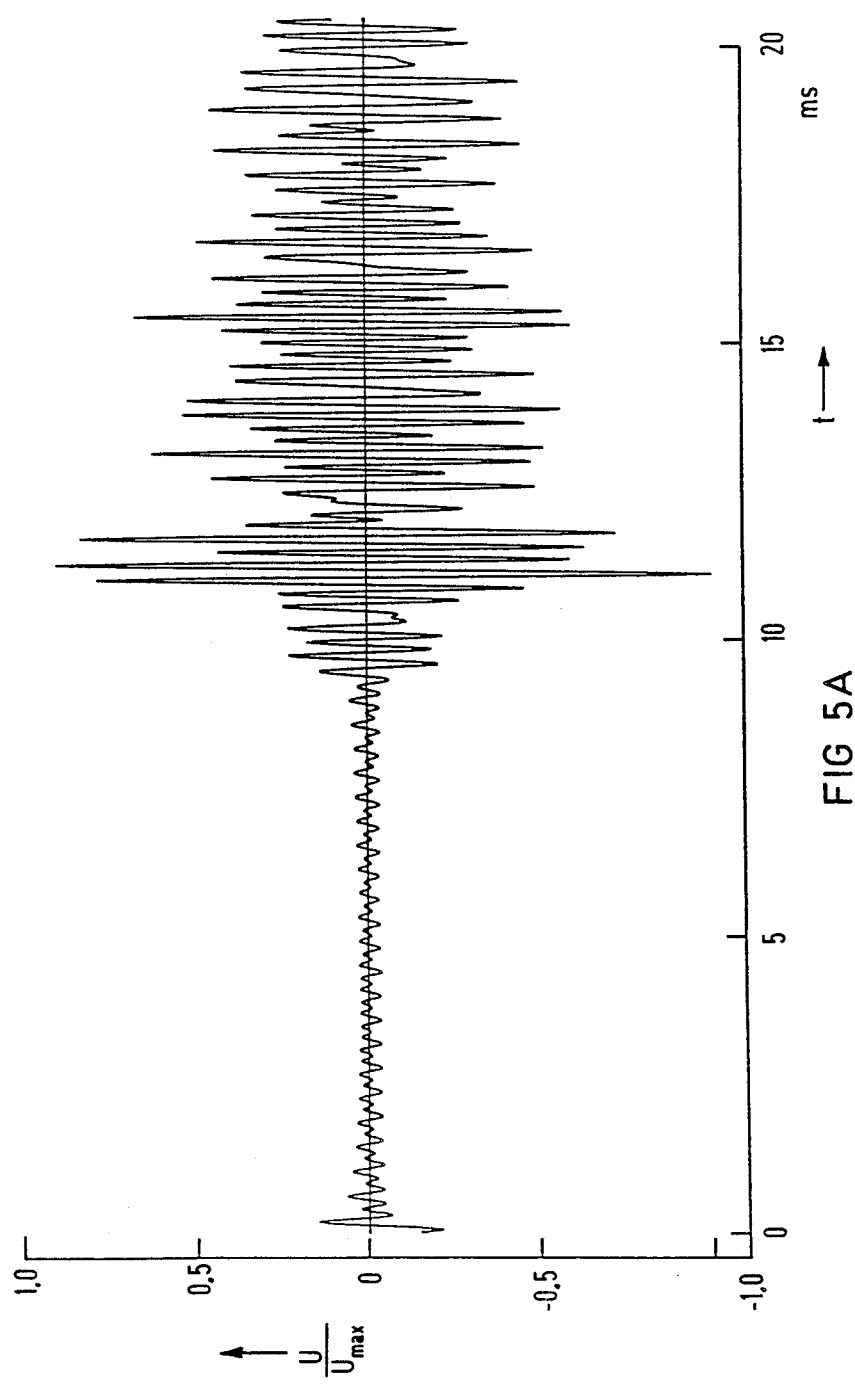

METHOD FOR LOCATION OF SHOCKS WITH A STRUCTURE-BORNE SOUND MONITORING SYSTEM, IN PARTICULAR IN PRESSURIZED ENCLOSURES IN POWER PLANTS

The invention relates to a method for the location of shocks or "bursts" using a structure-borne sound monitoring system, especially in pressurized enclosures, such as structural components and pipelines in power plants, which includes:

picking-up burst signals originating at a burst site with at least one structure-borne sound sensor mounted at different points on an enclosure to be monitored, and recording the burst signals with recording devices connected downstream of the at least one sensor; and filtering two burst signal components ($BS_1$, $BS_2$) out of the burst signal spectrum at frequencies ($f_1$, $f_2$) including frequency bandwidths ($\Delta f_1$, $\Delta f_2$), and referring the two burst signal components ($BS_1$, $BS_2$) to a rise time difference ($\Delta t_{1,2}$) resulting from dissimilar arrival times ($t_1$, $t_2$) of the two burst signal components at a given one of the at least one structure-borne sound sensor, so that in accordance with a general formula:

$$\left\{ L_{S-E} = \frac{\Delta t_{1,2} \cdot v_1 \cdot v_2}{v_1 - v_2} \right.$$

the sound travel distance ($L_{S-E}$) from the at least one structure-borne sound sensor to the burst site can be determined, wherein ($v_1$ $v_2$) represent the suspected propagation velocities at a given frequency.

The method has a particular significance for nuclear power plants, for example pressurized water reactors (PWR) and boiling water reactors (BWR). Assuring the integrity of the pressurized structural components and pipelines plays a particularly important role in this case. The structural components include not only the reactor pressure vessel but also the steam generator, primary coolant pumps, and pressure maintenance elements, to name only the most important.

Thus if loose or wobbling parts cause abnormal signals (bursts) from structure-borne sound or sound transmitted through solids in power plants in general, or in nuclear power plants in particular, then locating the shocks is one of the most important aids in determining the cause thereof.

A generic method is known, for instance, from the paper by B. J. Olma et al entitled "Schwingungs- und Körperschallüberwachung an Primärkreiskomponenten von Kernkraftwerken" [Monitoring Vibration and Structure-Borne Sound in Primary Loop Components of Nuclear Power Plants], in *VDI Berichte* [German Engineering Association Reports] 568 (1985), pages 13–18. However, accurate location is not always reliably possible with this prior art method, for the following reasons:

it is seldom clear whether the measured reference sound velocities are applicable to the signals presently occurring;

often, only the site of the induction of the sound into the pressurized enclosure can be determined, but not the actual shock site;

sometimes the number of signal pick-ups installed is not adequate to define the sound induction site more closely.

In the prior art method, magnetic, adapted structure-borne sound pick-ups that have two resonant frequencies are used, such as a pick-up-specific frequency at approximately 20 to 30 kHz and a fastener-specific frequency in the range from 5 to 10 kHz, for the separation of two burst signal components, where associated propagation velocities are postulated or suspected.

It is accordingly an object of the invention to provide a method for the location of shocks with a structure-borne sound monitoring system, in particular in pressurized enclosures in power plants, which overcomes the herein aforementioned disadvantages of the heretofore-known methods of this general type and in which:

more-accurate location of the burst site by means of self-checking is permitted, or in other words, operation with redundancy;

the number of structure-borne sound sensors or pick-ups required for a given measurement task can be reduced in general, without having to make sacrifices in reliability or replaceability of the results; and not only the sound induction sites but also shock or burst sites can be ascertained.

With the foregoing and other objects in view there is provided, in accordance with the invention, in a method for location of shocks or bursts using a structure-borne sound monitoring system, which includes:

picking-up burst signals originating at a burst site with at least one structure-borne sound sensor mounted at different points on an enclosure to be monitored, and recording the burst signals with recording devices connected downstream of the at least one sensor; and filtering two burst signal components ($BS_1$, $BS_2$) out of the burst signal spectrum at frequencies ($f_1$, $f_2$) including frequency bandwidths ($\Delta f_1$, $\Delta f_2$), and referring the two burst signal components ($BS_1$, $BS_2$) to a rise time difference ($\Delta t_{1,2}$) resulting from dissimilar arrival times ($t_1$, $t_2$) of the two burst signal components at a given one of the at least one structure-borne sound sensor, so that in accordance with a general formula:

$$\left\{ L_{S-E} = \frac{\Delta t_{1,2} \cdot v_1 \cdot v_2}{v_1 - v_2} \right.$$

the sound travel distance ($L_{S-E}$) from the at least one structure-borne sound sensor to the burst site can be determined, wherein ($v_1$ $v_2$) represent the suspected propagation velocities at a given frequency:

the improvement which comprises:

separating at least three burst signal components ($BS_i \ldots BS_n$) at frequencies ($f_1 \ldots f_n$) with electronic signal filter systems;

determining a group of signal onsets ($t_i \ldots t_n$) of the burst signal components ($BS_i \ldots BS_n$), where (i=1, 2, 3 \ldots n);

forming rise time differences ($t_i - t_r$) \ldots ($t_n - t_r$) with respect to a reference time ($t_r$) selected arbitrarily from the group of signal onsets ($t_i \ldots t_n$);

determining the dispersion behavior of the separated burst signal components ($BS_i \ldots BS_n$) from the rise time differences, as a function of the frequencies ($f_i \ldots f_n$) known from the filtering;

ascertaining the type of sound propagation ($s_0$ mode, $a_0$ mode) of the individual burst signal components and the group velocities ($v_i \ldots v_n$) belonging to the individual burst signal components ($BS_i \ldots BS_n$) by taking into account the wall thickness of the enclosure carrying the signal and by comparative analysis with the theoretical dispersion behavior; and subsequently determining the sound travel distance ($L_{S-E}$) with at least double redundancy based on the general formula, with at least two parameter sets to be inserted into the general formula.

In accordance with another mode of the invention, there is provided a method which comprises determining the theoretical dispersion behavior with mode diagrams for various wave modes ($s_0, a_0, a_1 \ldots$) of plate waves in the form of propagation velocities plotted as a function of frequency or as a function of the product of plate thickness times frequency.

In accordance with a concomitant mode of the invention, there is provided a method which comprises:

(a) ascertaining a variable $L_{S-E} = D + L$ in at least two received burst signal components ($BS_1, BS_2$) having dissimilar frequencies ($f_1, f_2$) of a single wave mode ($a_0$ or $s_0$), from a rise time difference $$(t_1 - t_2) = (D + L) \frac{v_1 - v_2}{v_1 \cdot v_2}$$

measured by the at least one structure-borne sound sensor, and from the velocities ($v_1$ and $v_2$), which are known and are dissimilar because of the dispersion, wherein D represents the sound travel distance in the structural component and L represents the sound travel distance in a sound conduction route joined at one side to the structural component;

(b) deriving intervals (A) of the rise time differences of the curves or envelopes of the measured values from a rise time/frequency diagram with the at least one structure-borne sound sensor and with fixed frequencies (F) for two different wave modes ($a_0$) and ($s_0$) and correspondingly with dissimilar propagation velocities ($v_s$ not equal to $v_a$), and subsequently ascertaining the three-dimensional distance $L_{S-E} = D + L$ in accordance with the relationship:

$$A = (D + L) \cdot \frac{v_s - v_a}{v_s + v_a}$$

and (c) ascertaining the site of the sound induction in accordance with the relationship:

$$A_q - A_p = (D_q - D_p) \cdot \frac{v_s - v_a}{v_s \cdot v_a}$$

and with the aid of hyperbolic section position finding, at fixed frequencies (F) with at least three structure-borne sound sensors, each furnishing burst component time differences for the $a_0$ and the $s_0$ mode, wherein the interval ($A_p$) between the $a_0$ and the $s_0$ curve in the diagram associated with one of the sensors is different from the interval ($A_q$) between the $a_0$ and the $s_0$ curve in the diagram associated with another of the sensors, and wherein the plate thickness or wall thickness is the same.

The invention is based on the recognition that first, bursts in themselves carry the information as to the velocity with which the signal components have reached the pick-up, and that second, at least two separable burst signal components are present in the burst, having velocities of sound which are different from one another and which are even known because of the aforementioned first condition. A closer study of the theory of plate waves has shown that with structure-borne sound signals or so-called bursts, both of these conditions are fulfilled. In location methods of the prior art, the full informational content of the bursts was never exploited.

The advantages of the invention are listed in further detail in the final section below entitled "4. Findings, Conclusions and Advantages".

Other features which are considered as characteristic for the invention are set forth in the appended claims.

Although the invention is illustrated and described herein as embodied in a method for the location of shocks with a structure-borne sound monitoring system, in particular in pressurized enclosures in power plants, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 5B:
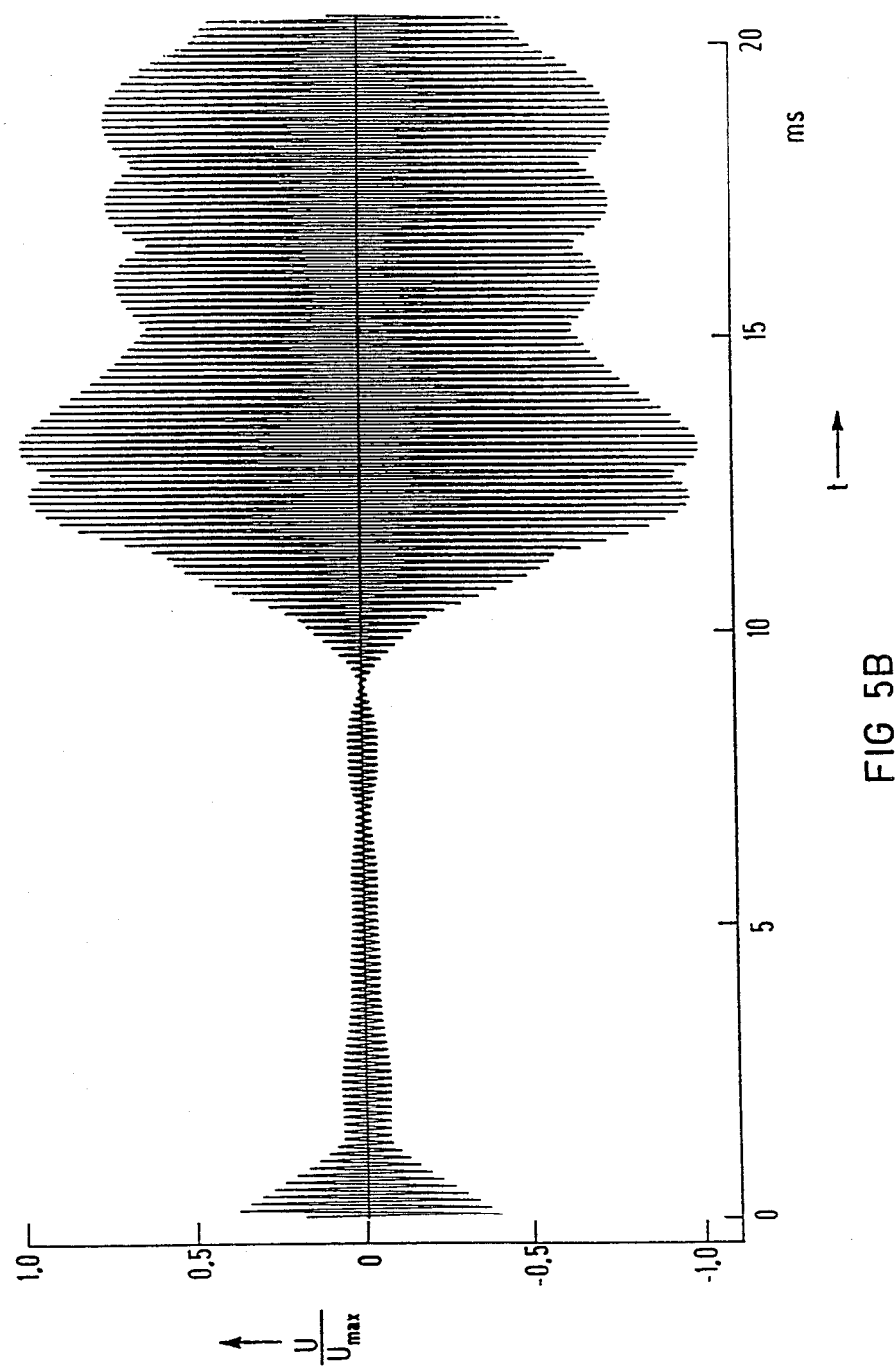
Figure 5C:
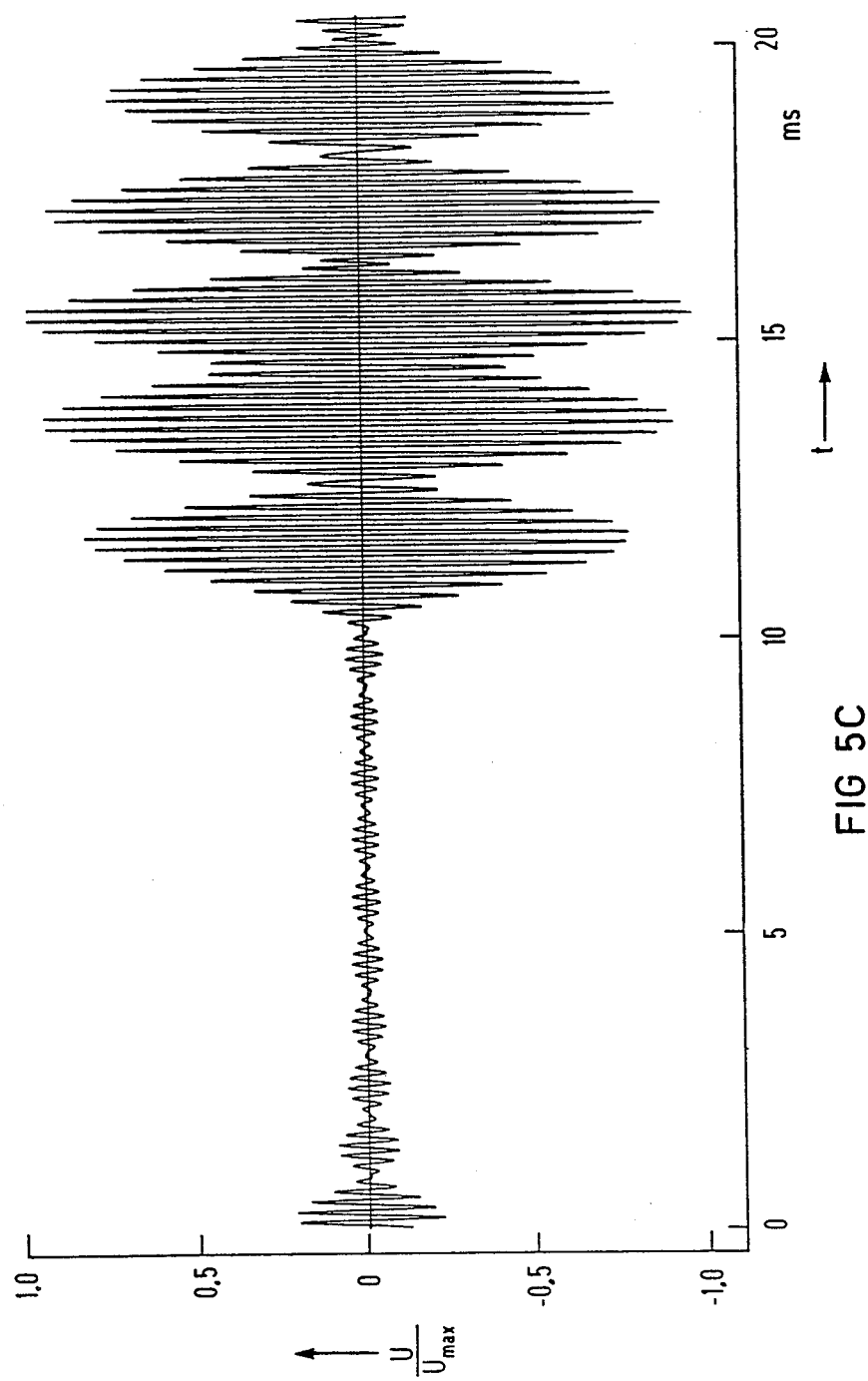
Figure 6:
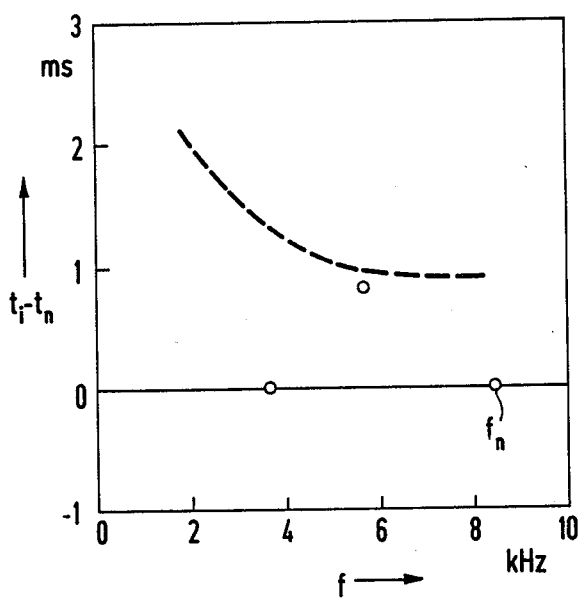
Figure 7:
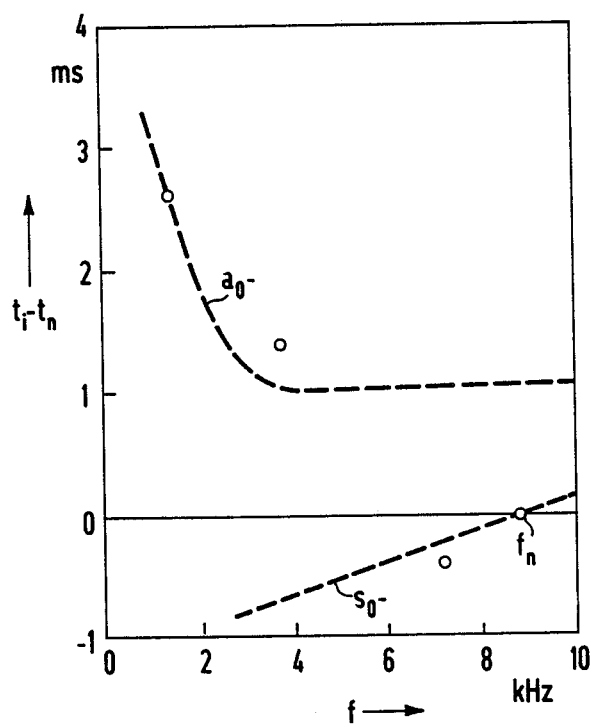

FIGS. 5A, 5B and 5C are graphs of three different components of a single burst signal, which were plotted during a test shock on a hot loop line of a pressurized water reactor after digital bandpass filtering, using three bandpass limit frequencies of 2.5 kHz to 5.0 kHz (FIG. 5A), 8.25 kHz to 8.75 kHz (FIG. 5B) and 5.25 kHz to 6.26 kHz (FIG. 5C), and with associated measured rise times of 9.2 ms (FIG. 5A), 9.2 ms (FIG. 5B) and 10.0 ms (FIG. 5C):

FIG. 6 is a time difference/frequency diagram, in which the time differences $t_i t_n$ (plotted in ms on the ordinate axis) dependent on the frequency f in kHz (on the abscissa axis) of three burst signal components are shown, the burst signal components arising in a test shock burst impacting on a pressurized water reactor loop line, in which $f_n$ represents the reference frequency and the curve drawn in dashed lines represents the theoretical dispersion of the $a_0$ mode, which serves the purpose of sound mode identification; and FIG. 7 is a diagram corresponding to FIG. 6, based on four picked-up burst signal components, in which the test shock was effected upon the pressure vessel of a boiling water reactor.

Referring now to the figures of the drawings in detail, it is noted that due to the complexity of the method according to the invention, it will first be explained below in principle while referring to FIGS. 1–4, and then two embodiments will be explained in detail while referring to Figs. 5A, 5B and 5C through 7. For the sake of better comprehension, the description is subdivided into sections 1–4 and corresponding subsections.

The formulas given below are numbered serially, for the sake of easier reference.

1. Discussion of location problems presented by rise time differences:

Some major simplifications are made in the following discussion. Among them are that sound mode transformations, particularly at the transitions from pipelines to vessel walls, are ignored, and it is assumed that the information expressed by the plate waves is at least approximately valid for the pipelines as well.

Figure 1:
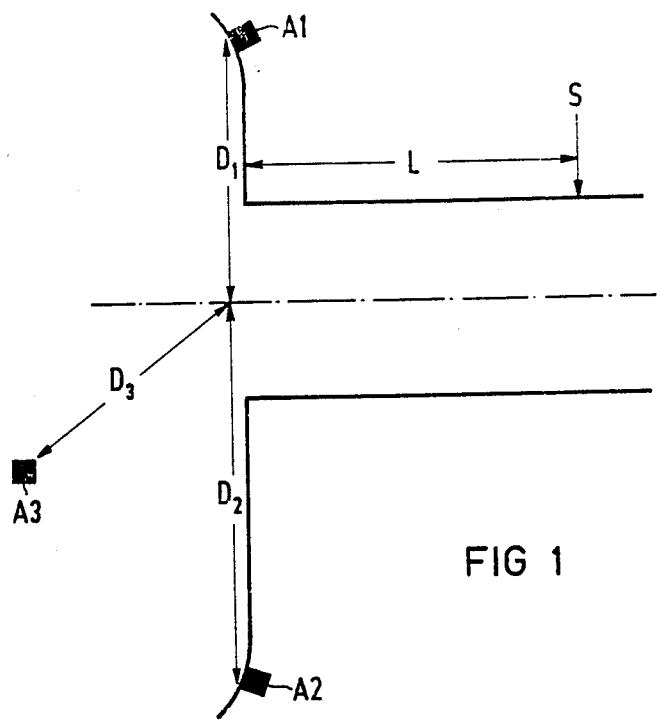
FIG. 1 is a fragmentary, diagrammatic, elevational view of a pressurized structural component, such as a steam generator for pressurized water nuclear power plants, having a pipeline connected thereto, with three structure-borne sound sensors attached to the steam generator as pick-ups.

Although this could certainly lead to inaccuracies in the location of sound sources with small pipeline diameters and thus especially at low sound signal frequencies, the method outlined at this point does permit at least an approximate determination of the sound velocity from the signals themselves, and thus a substantial improvement of the situation as compared with that in which it was not even possible to differentiate between the velocities of approximately 5.2 kms$^{-1}$ and 3.0 kms$^{-1}$, which in fact differ by almost a factor of 2. With this restriction, the basic problems will now be explained, referring to the diagrammatic illustration of a pipeline and part of a vessel wall (such as a wall of a reactor pressure vessel or steam generator) provided in FIG. 1. In FIG. 1, L is the length of the pipeline segment from the shock site S to the vessel wall. $D_i$ (i=1, 2, 3) are the shortest travel lengths from the pipeline connector to three pick-ups, in the form of structure-borne sound sensors A1, A2, A3 for sensing sound transmitted through solids. $t_i$ (i=1, 2, 3) represents the instants at which bursts are recorded in pick-ups $A_i$, and $v_i$ represent the structure-borne sound velocities along the way from the shock site to the pickups or sensors. Then, $$t = t_i - t_j = D_i/v_i - D_j/v_j + L(1/v_i - 1/v_j) \quad (1)$$

which is a general formula that can be derived inductively by the following process:

If the rise time difference $\Delta t_{2,1} = (t_2 - t_0) - (t_1 - t_0)$ of two structure-borne sound signals is to be ascertained, one of which is recorded by the pick-up A2 at time $t_2$ and the other by the pickup A1 at time $t_1$, and both signals belong to one and the same burst at the site S, then the following applies:

$$\begin{cases} \Delta t_{2,1} = (t_2 - t_0) - (t_1 - t_0) = \\ \dfrac{D_2 + L}{v_2} - \dfrac{D_1 + L}{v_1} = \dfrac{D_2}{v_2} - \dfrac{D_1}{v_2} + \\ L\left(\dfrac{1}{v_2} - \dfrac{1}{v_1}\right) \end{cases} \quad (1.1)$$

where $t_0$ represents the reference instant, which is generally the instant of the shock of the loose part on the pressurized enclosure. Since the pick-ups or structure-borne sound sensors A1 and A2 were taken into consideration in this formula, corresponding subscripts "1" and "2" have also been used for the associated lengths, namely $D_1$ and $D_2$, and for the associated velocities, namely $v_1$ and $v_2$. In this concrete case, the decision has been made that $D_1$ is not equal to $D_2$. Each of these two subscripts "1" and "2" can belong to either of two index groups i or j, where i=1, 2, 3 and j=1, 2, 3. Thus the general case is expressed that $D_i$ and $D_j$ can differ from one another or can be equal to one another. The same applies to $v_i$ and $v_j$, as well as to $t_i$ and $t_j$.

Based on the theory of sound propagation conditions in plates (e.g., pipe or vessel walls), (see, for example, B. J. Krautkrämer and H. Krautkrämer, *Werkstoffprufung mit Ultraschall* [Material Testing with Ultrasound], fourth edition, Springer Verlag, 1980), various kinds of sound propagation with various group velocities occur, which furthermore also exhibit the phenomenon of dispersion (see FIG. 2). Therefore in the location process (that is, in the evaluation of the above formula), it is not clear what values should be used for $v_i$ or $v_j$ in order to ascertain the sound travel distances $D_i$ and L from the measured rise time differences $\Delta t$, even if reference velocities are available from test shock data.

There is also a case, which previously was often assumed in practice, that $v_i$ (i=1, 2, 3, ...) = $v = v_j$ (j=1, 2, 3) are all of equal magnitude;

$$\Delta t = D_i/v_i - D_j/v_j = (D_i - D_j)/v \quad (2)$$

and in principle only the site of the sound induction (that is, the magnitude of $D_i$) is determinable.

If individual reactor components are only provided with a few pick-ups, or if only one of the pick-ups even receives a sufficiently large signal, then in the past, either any indication as to location was usually impossible, or additional pick-ups had to be reset during operation.

As a limitation, it should be noted that a "loop method" is known (for example, see B. J. Olma, *Progress in Nuclear Energy*, 1985, Vol. 15, pages 583–594), with which a kind of location is also possible with one or two pick-ups, if at least two components that have different velocities $v_1$ and $v_2$ can be separated within the burst. In that case, the following equation applies to the rise time differences of the first components:

$$\Delta t = (D + L)(v_2 - v_1)/v_1 \cdot v_2 \quad (3)$$

and if $v_1$ and $v_2$ are known, then D+L can be ascertained.

B. J. Olma et al have separated two sound mode components in one burst having different velocities, by using the pick-up resonance or magnet adaptation resonance, and are thus capable of performing a location. However, this method only partially solves the fundamental problems in location, because of the following factors:

the dispersion is only incompletely taken into account; and the separation of the modes is highly incomplete: For instance, it is assumed without comment that in the frequency band of the magnet adaptation resonance (at approximately 5 to 10 kHz), only the $a_0$ mode occurs. The fact that this is not always true will be documented below using test shock data.

Figure 2:
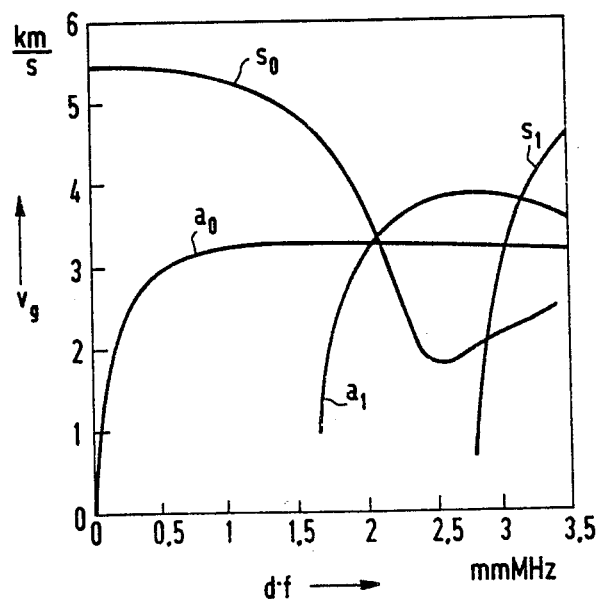
FIG. 2 is a known mode diagram, in which the dispersion-dictated course of the group velocity $v_g$ (on the ordinate) of various sound modes $a_0, s_0, a_1, s_1$ is shown as a function of the product of the plate thickness times the frequency, which equals d·f (on the abscissa)

2. Exploitation of the Dispersion of Sound Modes for Determining the Actual Sound Velocities from the Burst Itself:

2.1. Separation of the sound modes $s_0$ and $a_0$ based on the dispersion:

According to FIG. 2, the relevant parameter range for d·f ≤ 2.5 mm MHz for nuclear power plant components, the $s_0$ mode and the $a_0$ mode exhibit entirely different dispersion. While the $s_0$ mode velocity at a low d·f initially takes a nearly constant course and then only drops off steeply beyond d·f ≈ 1.5 mm MHz, the $a_0$ mode velocity exhibits a great dispersion, especially at low values for d·f, and takes a virtually constant course from d·f ≈ 0.7 mm MHz on. The $a_1$ mode was heretofore undetectable in structure-borne sound monitoring in nuclear power plants.

By measuring this dissimilar dispersion behavior in the burst itself (in fact by doing so particularly in the case of anomalies as well), the components of the $s_0$ mode and $a_0$ mode can be identified. This can be done in the following manner:

If a burst is transformed into the frequency band then, among others, there are contributions in virtually the entire frequency band, although pronounced peaks (resonances) occur at a few frequencies. If bandpass filters are then set to the pronounced peaks, or to portions of the more-continuous frequency spectrum, and the corresponding burst components are represented in the chronological range and the component onsets are measured in the usual manner, a series of times $t_i(f_i)$ (i=1, ...) are obtained, to which the frequency $F_i$ is unequivocally assigned. After selection of an arbitrary value $t_n(f_n)$ as a time reference, the rise time differences $\Delta t_i = t_i(f_i) - t_n(f_n)$ are plotted as a function of the frequency values $f_i$. The result is a diagram that corresponds to either FIG. 3 or 4, with FIG. 3 occurring for a reference point on the $a_0$ mode curve and FIG. 4 occurring for a reference point on the $s_0$ mode curve. It is therefore possible to unequivocally recognize which mode has to be assigned to the individual components of the burst at the various frequencies, from the signs (+ or −) and the course of the curves. Thus an unequivocal mode separation is theoretically possible.

2.2 Mode separation and location in practice:

In practice, somewhat different results can occur:

(I) One of the modes may not occur at all. For instance, the corresponding components (over relatively long sound travel distances) may be damped too severely. Experience shows that this is most likely for the $s_0$ mode.

(II) At certain frequencies, Δt values which fall between the two curves also appear if both $s_0$ and $a_0$ modes contribute to the burst component in the selected frequency band.

If only the $a_0$ mode is present, as in (I), then making reference to equation (3) it is seen that because of its dispersion, various values $\Delta t_k = (D+L)(v_k - v_n)/v_k \cdot v_n$ can be determined and assigned to sound frequencies. Since the structural component on which the pick-up is mounted (such as the reactor pressure vessel, steam generator, etc.) is known, the plate thickness and thus the velocities $v_k$ and $v_n$ belonging to the frequencies are also known according to the plate wave theory. The result is a value for D+L. If this is satisfied for the same result for the signals of a plurality of pick-ups, then for each of the pick-ups it follows that there is a value $D_i + L$. At values having the same (arbitrarily selected) frequency and hence velocity v of the burst components in various pick-ups, the various rise time differences (between analogous burst components in various pick-ups) $\Delta t_{lm}$ can be formed, and it follows that:

$$t_{lm} = (D_l + L)/v - (D_m + L)/v = (D_l - D_m)v \ (4); \ cf. \quad (2)$$

This can be utilized for determining the sound induction site.

Figure 3:
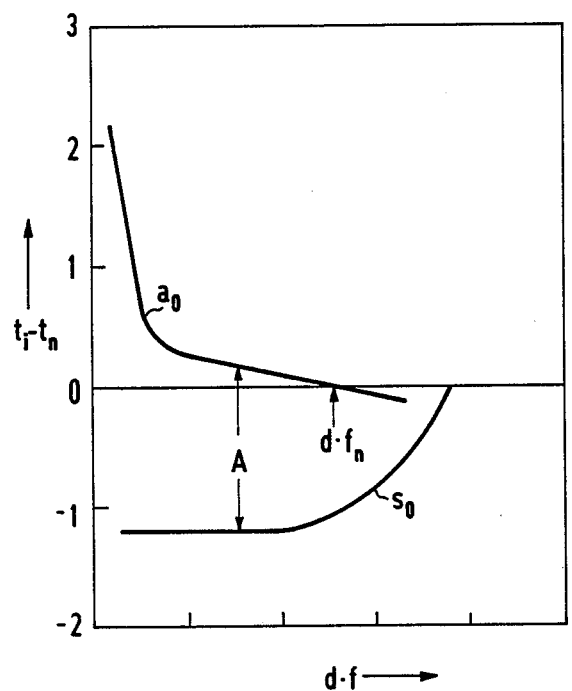
FIG. 3 is a diagram illustrating the course of the time differences $t_i - t_n$ (plotted in arbitrary units on the ordinate) for burst signal components as a function of the product d·f (on the abscissa) taking into account the dispersion of the sound waves, with a point on the $a_0$ dispersion curve being the reference and with a reference normal $t_i - t_n = 0$ for the time difference.

If as in (II) both modes ($s_0$ and $a_0$) are detected, and if two curves corresponding to FIG. 3 are present, or if at least the envelopes of the domain of possible rise time differences are recognizable, then the interval A of the curves or envelopes is obtained from the following:

$$A = (D+L)(v_s - v_a)/(v_s \cdot v_a) \quad (5); \ cf. \ (3)$$

where for $v_s$ and $v_a$ once again the theoretical sound velocities given as a function of plate thickness, mode and frequency can be used, so that a value D+L follows. If different curve intervals $A_q$ and $A_p$ result for various pick-ups at the same frequencies and the same plate thickness, then $$A_q - A_p = (D_q - D_p)(v_s - v_a)/v_s \cdot v_a \quad (6)$$

and from that, once again, location of the sound induction is possible.

3. Application of the Evaluation Method to Test Shock Bursts:

3.1 Test shock on hot loop line of a PWR (pressurized water reactor):

In FIG. 5, three examples of burst components after bandpass filtering operations are shown for a test impact on a hot loop line of a PWR.

In column 3 of table 1, rise time differences that have been ascertained are listed, with the component at 8.5 kHz being used as a reference. These are only three values, nevertheless, an analysis in accordance with section 2 above is fundamentally possible.

Figure 4:
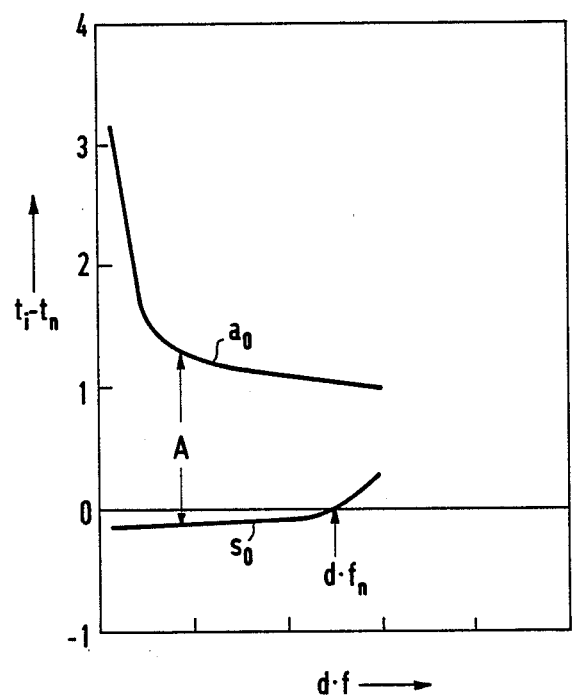
FIG. 4 is a diagram which corresponds to FIG. 3, but in which the reference or reference normal for the time difference $t_i t_n = 0$ is a point on the $s_0$ dispersion curve.

The three rise time differences are plotted in FIG. 6 as a function of the center frequency of the bandpass filter. A comparison of FIG. 6 with FIGS. 3 and 4 unequivocally shows that the situation is as represented in FIG. 4. In other words, the value at 5.75 kHz must be assigned to an $a_0$ mode, while the values at 3.75 kHz and 8.5 kHz are clearly $s_0$ mode components. In column 4 of Table 1, the theoretical sound velocities corresponding to this assignment (taking into account the loop line wall thickness of 50 mm) are listed in accordance with FIG. 2. From the values of lines 2 and 3 a sound travel distance of 4.75 + 0.6 meters can then be calculated, the indicated error being based solely on the estimated uncertainty of 0.1 ms in the rise time difference determination. The ascertained sound travel distance is in agreement with the actual sound travel of 5.4 meters.

3.2 Test shock on the reactor vessel of a BWR (boiling water reactor):

As early as 1982, the firm Kraftwerk Union A.G. of Mülheim/Ruhr, West Germany studied some test shock data following (analog) filtering. For one shock, there were three relatively prominent peaks in the frequency band at 1.55 kHz, 3.8 kHz and 7.25 kHz, which were well separable with the analog technique, and some peaks at 8.9 kHz, which were not fully separated from the peak at 7.25 kHz.

In Table 2, column 3, the rise time differences of the burst components are listed, with the component at 8.9 kHz being used as a reference. These rise time differences are plotted in FIG. 7 as a function of the frequency.

By comparison with FIGS. 3 and 4, the two burst components at 1.55 kHz and 3.8 kHz are to be assigned to $a_0$ mode components, while the other two values indicate the $s_0$ mode. According to FIG. 2, the velocities listed in column 4 of the table are therefore to be expected.

If the sound travel distance $L_{S-A}$ from the shock site to the pick-up is calculated using the values in the table, three values result:

SW(1.55 kHz) = 14.1 m
SW(3.80 kHz) = 13.9 m
SW(7.25 kHz) = 14.0 m.

Initially it is highly satisfactory for the three sound travel or $L_{S-A}$ values to agree very well with one another. The actual sound travel distance of approximately 13.2 m is ascertained to approximately 6% accuracy. However, if the theoretical rise time differences are calculated afterward as a function of the burst component frequencies, using the now-known sound travel distance, the curves shown in dashed lines in FIG. 7 are obtained, which once again confirms the above mode assignment.

4. Findings, Conclusions and Advantages:

Now that it has been demonstrated theoretically and with recourse to test shock data that in the location of shock events, the dispersion of the sound modes on one hand has a considerable influence on the accuracy, and on the other hand can be exploited in order to find the actual sound velocities from the bursts themselves, the following conclusions and advantages can be stated:

(1) Analyses of bursts should always be performed in the frequency band as well, or after bandpass filtering operations. The novel analysis method that is thereby possible, with simultaneous determination of the sound velocities from the signals themselves, allows reliable locations, and as a result, decisive improvements in the evaluation of a source of anomalies, with faster prevention of threatened damage as necessary (maintaining plant operability) and with less radiation exposure during repairs.

(2) The novel analysis method permits adequate locations of the shock site as well of the sound induction site, with only a few pick-ups.

(3) It is unnecessary to derive reference velocities from test shocks.

(4) During inspection, for instance, fewer shock sites than before (in other words, less radiation exposure) are needed for functional testing of the pick-ups.

(5) In the context of the invention, computer-supported automatic analyses of the proposed type can be performed and are useful. This could advantageously be done in such a way that approximately 10 bandpass values in the frequency band of the monitoring are predetermined, the corresponding burst components are automatically separated in the chronological range, and the time differences are ascertained using correlation methods. If the few parameters relating to wall thicknesses, etc., are also predetermined, then in principle the computer could also ascertain the sound velocities directly, even during anomalous events.

5. Table 1 and Table 2:

TABLE 1

Summary of the data of three burst components for one test shock on the hot loop line of a PWR

| Center frequency of the bandpass, in kHZ | Parameter d.f, in mm MHz | Rise time difference t in ms | Theoretical velocities and sound mode in m/ms |
|---|---|---|---|
| 3.75 | 0.19 | 0.0 | $s_0$: 5.4 |
| 5.75 | 0.29 | 0.8 | $a_0$: 2.8 |
| 8.50 | 0.43 | 0.0 (reference) | $s_0$: 5.3 |

TABLE 2

Summary of the data of burst components for one test shock on the hot loop line of a BWR pressure vessel

| Center frequency of the bandpass, in kHZ | Parameter d.f, in mm MHz | Rise time difference t in ms | Theoretical velocities and sound mode in m/ms |
|---|---|---|---|
| 1.55 | 0.26 | 2.6 | $a_0$: 2.4 |
| 3.80 | 0.65 | 1.4 | $a_0$: 3.0 |
| 7.25 | 1.24 | −0.4 | $s_0$: 4.9 |
| 8.90 | 1.52 | 0.0 (reference) | $s_0$: 4.3 |

The foregoing is a description corresponding in substance to German Application P No. 37 02 879.0, dated Jan. 31, 1987, the International priority of which is being claimed for the instant application, and which is hereby made part of this application. Any material discrepancies between the foregoing specification and the aforementioned corresponding German application are to be resolved in favor of the latter.

I claim:

1. In a method for location of shocks or bursts using a structure-borne sound monitoring system, which includes:

picking-up burst signals originating at a burst site with at least one structure-borne sound sensor mounted at least one different point on an enclosure to be monitored, and recording the burst signals with recording devices connected downstream of the at least one sensor; and filtering two burst signal components ($BS_1$, $BS_2$) out of the burst signal spectrum at frequencies ($f_1$, $f_2$) including frequency bandwidths ($\Delta f_1, \Delta f_2$), and referring the two burst signal components ($BS_1$, $BS_2$) to a rise time difference ($\Delta t_{1,2}$) resulting from dissimilar arrival times ($t_1$, $t_2$) of the two burst signal components at a given one of the at least one structure-borne sound sensor, so that in accordance with a general formula $$\left[ L_{S-E} = \frac{\Delta t_{1,2} \cdot v_1 \cdot v_2}{v_1 - v_2} \right.$$

the sound travel distance ($L_{S-E}$) from the at least one structure-borne sound sensor to the burst site can be determined, wherein ($v_1, v_2$) represent the suspected propagation velocities at a given frequency:

the improvement which comprises: separating at least three burst signal components ($BS_i \ldots BS_n$) at frequencies ($f_1 \ldots f_n$) with electronic signal filter systems;

determining a group of signal onsets ($t_i \ldots t_n$) of the burst signal components ($BS_1 \ldots BS_n$), where ($i = 1, 2, 3 \ldots n$):

forming rise time differences ($t_i - t_r \ldots t_n - t_r$) with respect to a reference time ($t_r$) selected arbitrarily from the group of signal onsets ($t_i \ldots t_n$);

determining the dispersion behavior of the separated burst signal components ($BS_i \ldots BS_n$) from the rise time differences, as a function of the frequencies ($f_i \ldots f_n$) known from the filtering:

ascertaining the type of sound propagation ($s_0$ mode, $a_0$ mode) of the individual burst signal components and the group velocities ($v_i \ldots v_n$) belonging to the individual burst signal components ($BS_i \ldots BS_n$) by taking into account the wall thickness of the enclosure carrying the signal and by comparative analysis with the theoretical dispersion behavior; and subsequently determining the sound travel distance ($L_{S-E}$) with at least double redundancy based on the general formula, with at least two parameter sets to be inserted into the general formula.

2. Method according to claim 1, which comprises determining the theoretical dispersion behavior with mode diagrams for various wave modes ($s_0, a_0, a_1 \ldots$) of plate waves in the form of propagation velocities plotted as a function of frequency.

3. Method according to claim 1, which comprises determining the theoretical dispersion behavior with mode diagrams for various wave modes ($s_0, a_0, a_1 \ldots$) of plate waves in the form of propagation velocities plotted as a function of the product of plate thickness times frequency.

4. Method according to claim 1, which comprises:
(a) ascertaining a variable $L_{S-E} = D + L$ in at least two received burst signal components ($BS_1, BS_2$) having dissimilar frequencies ($f_1, f_2$) of a single wave mode ($a_0$ or $s_0$), from a rise time difference $$(t_1 - t_2) = (D + L) \cdot \frac{v_1 - v_2}{v_1 \cdot v_2}$$

measured by the at least one structure-borne sound sensor, and from the velocities ($v_1$ and $v_2$), which are known and are dissimilar because of the dispersion, wherein D represents the sound travel distance in the structural component and L represents the sound travel distance in a sound conduction route joined at one side to the structural component:

(b) deriving intervals (A) of the rise time differences of the curves or envelopes of the measured values from a rise time/frequency diagram with the at least one structure-borne sound sensor and with fixed frequencies (F) for two different wave modes ($a_0$) and ($s_0$) and correspondingly with dissimilar propagation velocities ($v_s$ not equal to $v_a$), and subsequently ascertaining the three-dimensional distance $L_{S-E} = D + L$ in accordance with the relationship:

$$A = (D + L) \cdot \frac{v_s - v_a}{v_s + v_a}$$

and
(c) ascertaining the site of the sound induction in accordance with the relationship:

$$A_q - A_p = (D_q - D_p) \cdot \frac{v_s - v_a}{v_s \cdot v_a}$$

and with the aid of hyperbolic section position finding, at fixed frequencies (F) with at least three structure-borne sound sensors, each furnishing burst component time differences for the $a_0$ and the $s_0$ mode, wherein the interval ($A_p$) between the $a_0$ and the $s_0$ curve in the diagram associated with one of the sensors is different from the interval ($A_q$) between the $a_0$ and the $s_0$ curve in the diagram associated with another of the sensors, and wherein the plate thickness or wall thickness is the same.

* * * * *